United States Patent [19]

Hori et al.

[11] 4,049,904
[45] Sept. 20, 1977

[54] PLASTIC LAMINATED METALLIC FOIL AND METHOD FOR PREPARING THE SAME

[75] Inventors: Yutaka Hori; Zenzo Honda; Kenji Suzuki; Keiji Nakamoto; Yoshiharu Yamamoto, all of Toyohashi, Japan

[73] Assignee: Nitto Electric Industrial Co., Ltd., Ibaraki, Japan

[21] Appl. No.: 300,086

[22] Filed: Oct. 24, 1972

Related U.S. Application Data

[62] Division of Ser. No. 93,784, Nov. 30, 1970, abandoned.

[30] Foreign Application Priority Data

Nov. 28, 1969 Japan .................... 44-95974
Jan. 30, 1970 Japan .................... 45-8637
Jan. 30, 1970 Japan .................... 45-8638

[51] Int. Cl.$^2$ .................. H01B 7/18; B32B 7/02; B32B 15/08
[52] U.S. Cl. ................... 174/107; 428/215; 428/461; 428/463
[58] Field of Search ............. 161/213, 214, 216, 218, 161/252, 254, 256; 117/75, 132 C; 174/120 C, 120 SR, 102 R, 102 SC, 105, 107; 428/215, 461, 463, 516, 520, 522

[56] References Cited

U.S. PATENT DOCUMENTS

| | | | |
|---|---|---|---|
| 3,233,036 | 2/1966 | Jachimowicz | 174/107 |
| 3,264,272 | 8/1966 | Rees | 260/88.1 R |
| 3,347,419 | 10/1967 | Brandt et al. | 222/107 |
| 3,359,154 | 12/1967 | Clark | 161/235 |
| 3,459,877 | 8/1969 | Bullock et al. | 174/107 |
| 3,467,569 | 9/1969 | Weber et al. | 161/160 |
| 3,505,143 | 4/1970 | Haas et al. | 156/243 |
| 3,507,978 | 4/1970 | Jachimowicz | 174/105 |
| 3,616,191 | 10/1971 | Fuerholzer et al. | 161/190 |
| 3,681,515 | 8/1972 | Mildner | 174/107 |
| 3,687,748 | 8/1972 | Clock et al. | 161/216 |
| 3,692,925 | 9/1972 | Kindij | 174/120 C |
| 3,710,009 | 1/1973 | Hoeg et al. | 174/120 SR |

Primary Examiner—William R. Dixon, Jr.
Attorney, Agent, or Firm—Sughrue, Rothwell, Mion, Zinn and Macpeak

[57] ABSTRACT

A plastic laminated metallic foil is prepared by laminating a first layer of a polymer selected from the group consisting of ethylene-unsaturated carboxylic acid copolymers, ethylene-unsaturated carboxylic acid ester copolymers, ethylene-unsaturated carboxylic acid-unsaturated carboxylic acid-ester ternary copolymers, ionomers containing these copolymers as the base, and graft copolymers of polyethylene and unsaturated carboxylic acids on at least one surface of a metallic foil, and further laminating a second layer of a polymer selected from the group consisting of polyethylene, ethylene-vinyl acetate copolymers, ethylene-unsaturated carboxylic acid ester copolymers, and graft copolymers of polyethylene and unsaturated carboxylic acid esters onto the first polymer layer of the metallic foil.

26 Claims, 3 Drawing Figures

PLASTIC LAMINATED METALLIC FOIL AND METHOD FOR PREPARING THE SAME

This is a divison of application Ser. No. 93,784, filed Nov. 30, 1970, now abandoned.

BACKGROUND OF THE INVENTION

1. Field of the Invention

The present invention relates to a plastic laminated metallic foil and more particularly to a plastic laminated metallic foil, which exhibits excellent properties as a covering material and specifically, electrostatic shielding layer and moisture proofing layer for communication cable. A method for producing these foils is also an integral part of the present invention.

2. Description of the Prior Art

In recent years, covering materials of the shielding type having favorable moisture proofness have been highly desired. In one instance, there is a shielded piece obtained by covering one surface of a metallic foil with a polyolefin as disclosed in Japanese patent publication No. 14350/1965 (now abandoned).

According to the invention of that patent publication, since the shielded piece is bonded to a jacket, when the cable is stretched or bent, the metallic foil and jacket are hardly broken. However, since shielded piece possesses but one layer of polyolefin, it is difficult to firmly bond the polyolefin layer to both of the metallic foil and the jacket. As a result, when employing a polyolefin which adheres favorably with the metallic foil, the jacket is extremely difficult to bond to the polyolefin. On the other hand, when employing material other than a polyolefin which adheres favorably with the jacket, the metallic foil remains difficult to bond to the material.

Hence, satisfactory covering materials for communication cable leave much to be desired.

SUMMARY OF THE INVENTION

It is therefore the primary object of the present invention to eliminate the above-mentioned disadvantages by utilizing certain findings which the present inventors have made and thereby produce a plastic laminated metallic foil having excellent adhesiveness between each of the layers as well as both surfaces of the plastic laminated foil.

It is another object of the present invention to provide a method for producing the above-mentioned plastic laminated metallic foil.

Accordingly, the present invention provides a plastic laminated metallic foil prepared by laminating a first layer of a polymer selected from the group consisting of ethylene-unsaturated carboxylic acid copolymers, ethylene-unsaturated carboxylic acid ester copolymers, ionomers containing these copolymers as the base, and graft copolymers of polyethylene and unsaturated carboxylic acids on at least one surface of a metallic foil, and further laminating a second layer of a polymer selected from the group consisting of polyethylene, ethylene-vinyl acetate copolymers, ethylene-unsaturated carboxylic acid ester copolymers, and graft copolymers of polyethylene and unsaturated carboxylic acid esters onto the first polymer layer of the metallic foil. All of these copolymers should preferably have a molecular weight in the range of from 10,000–50,000. However, this is not mandatory.

The nature, details, and utility of the present invention will be made clearer from the following detailed description.

DETAILED DESCRIPTION OF THE INVVENTION

Figure 1:
FIG. 1 is a cross-sectional view showing the plastic laminated metallic foil according to the present invention in which the plastic films are laminated on only one side of the metallic foil.

As the metallic foils to be employed in the present invention, there are, for example, aluminum, copper, iron, steel, silver, gold, tin foils, aluminum and copper foils.

As the copolymers of ethylene and unsaturated carboxylic acids, there are, for example, copolymers obtained from ethylene and mono- or di-valent unsaturated aliphatic carboxylic acids containing 2–12 carbon atoms (except for these carbons in the carboxylic groups), and particularly, acrylic acid, methacrylic acid, itaconic acid, and maleic anhydride. Furthermore, ternary copolymers consisting of ethylene, the above-described unsaturated carboxylic acids, and the carboxylic esters thereof may also be employed. As the esters in these copolymers, there are ethyl acrylate, propyl acrylate, butyl acrylate, ethyl methacrylate, propyl methacrylate, and butyl methacrylate. In this case, it is desirable to use no more than 20 wt. % of the ester with respect to the amount of ethylene. In cases where the amount of the ester employed is more than 20 wt. % with respect to that of the ethylene, its adhesion to polyethylene, ethylenevinyl acetate copolymer, etc., is extremely diminished. Furthermore, in this case, there may be employed ionomer resins obtained in such a manner that the above-mentioned copolymers are employed as base resin, and a metal cation is caused to combine therewith, whereby the copolymer molecules are cross-linked by the ionic bonding force of carboxylic anion with metal cation. (See Japanese patent publication No. 6810/1964). In this case, as the metal cations contemplated, there are ionizable organic or inorganic metal salts. Illustrative of these are magnesium acetate, strontium hydroxide, sodium hydroxide, and zinc acetate. The metal salt is employed in an amount sufficient for neutralizing at least 10% of the carboxylic acid. For example, there is "Saline A-1602", manufactured by DuPont Co. Furthermore, graft copolymers of polyethylene and the above-mentioned unsaturated carboxylic acids may be also used. Regardless the above-mentioned copolymers (including graft copolymers), a copolymer consisting of 50–98 wt. % of ethylene and 50–2 wt. % of carboxylic acid or carboxylic acid and carboxylic acid ester is favorable, and particularly, one consisting of 70–90 wt. % of ethylene and 30–10 wt. % of carboxylic acid or carboxylic acid and carboxylic acid ester is preferred. In the case where the ethylene content is greater than 98 wt. %, the adhesiveness with respect to metallic foil becomes insufficient. On the other hand, when the ethylene content is less than 50 wt. %, the adhesiveness of the ethylene with respect to the second layer of polyethylene, ethylene-vinyl acetate copolymer, or ethylene-unsaturated carboxylic acid ester copolymer becomes inferior.

The effects of the ethylene-vinyl acetate copolymer used in the present invention is good when the amount of vinyl acetate is no more than 30% by weight in content. A range of 2 to 20% by weight is particularly excellent. When it is more than 30% by weight, the adhesion to the covering jacket (e.g., polyethylene), is undesirably lowered.

The ester in the ethylene-unsaturated carboxylic ester employed in the present invention is an ethyl, propyl, or butyl ester of unsaturated carboxylic acids as described above. The amount of unsaturated carboxylic ester present in the copolymer is preferably no more than 95% by weight and most preferably 1 to 85% by weight. In case it is more than 95% by weight, the adhesion of the copolymer to the covering jacket is undesirably lowered. As the graft copolymers of polyethylene and the above-mentioned unsaturated carboxylic esters, there are, for example, "Bakelite DPDB-6169," manufactured by the Union Carbide Co. In general, the amount of ester employed in the graft copolymer is preferably no more than 70% by weight, and most preferably 10 to 70% by weight. In the plastic laminated metallic foil according to the present invention, the adhesion treatment may be carried out in such a manner that the surface of the outer plastic layer which does not come into contact with the first layer is treated by commonly known methods. Illustrative of these are corona discharge, oxidizing flame, and chromic acid.

In the case where the plastic laminated metallic foil according to this invention is employed as a covering layer for cable, the thickness of the metallic foil should be about 100–250$\mu$. The thickness of double layer plastic film should be about 45–75$\mu$, and in this case, it is preferred that the thickness of the outer (second) layer (e.g., polyethylene) be about 20–30$\mu$. Of course, these thicknesses mentioned above will vary in accordance with the purpose for which the plastic laminated metallic foil according to this invention is employed.

Since the second plastic layer of the plastic laminated metallic foil according to this invention has excellent adhesiveness with respect to polyolefins (e.g., polyethylene, polypropylene, and polyolefin containing less than 5 wt. % of vinyl chloride or vinyl acetate) employment of the plastic laminated metallic foil of the present invention as a shielding layer for communication cable provides an excellent communication cable. This is especially true where polyethylene is employed as the jacket cover.

In the following, the plastic laminated metallic foil according to this invention will be described in connection with the accompanying drawing.

DETAILED DESCRIPTION OF THE DRAWINGS

Figure 2:
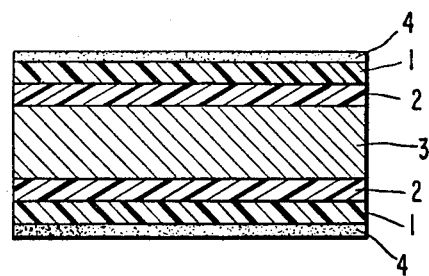
FIG. 2 is a sectional view showing the plastic laminated metallic foil according to the present invention in which the plastic films are laminated on both sides of the metallic foil.

In FIGS. 1 and 2, reference numeral 1 designated a second layer of polyethylene, ethylene-vinyl acetate copolymer, or ethylene-unsaturated carboxylic acid copolymer, 2, a first layer of an ethylene-unsaturated carboxylic ester copolymer, etc., 3 a metallic foil, and 4 an adhesion treatment layer, respectively.

Figure 3:
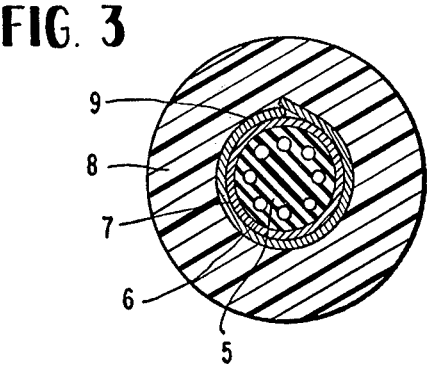
FIG. 3 is a sectional view showing an instance in which the plastic laminated metallic foil according to this invention is employed as a shielding layer for a communication cable.

FIG. 3 is a sectional view illustrating the case in which the plastic laminated metallic foil according to the present invention is employed as a shielding layer for communication cable in which reference numeral 5 designates an assembled core, 6 a bundled layer of polyester film or synthetic rubber tape, 7 the plastic laminated metallic foil of this invention, 8 an outer surface plastic jacket, and 9 an adhered portion of the metallic foil of the plastic laminated metallic foil and the surface of the polymer, respectively. The adhesion of this adhered portion is particularly excellent in the case where the plastic laminated metallic foil of this invention is employed.

Next, a method for producing the plastic laminated metallic foil of this invention will be described.

A double layer plastic film can be obtained in such a manner that two film layers previously formed separately are caused to adhere to each other by means of thermally pressing adhesion or by employment of an adhesive. Either method, however, leaves much to be desired. This is due to the fact that the adhesiveness between both layers is insufficient in either case. Furthermore, the number of process steps are great. In order to obtain the double layer plastic film of the plastic laminated metallic foil of the present invention, a multilayer extrusion process is the most suitable method. That is, by the multilayer extrusion process, two kinds of polymers forming the first and second layers being separately molten, are extruded as two streams. These two streams are introduced into a single die to form a single fluid consisting of each layer of the two polymers in its molten state, and the single fluid thus obtained is extruded from the die, thereby providing an integrated film of the two kinds of polymers.

For the extruding machine applicable, an inflation extruding machine and a T-die inflation extruding machine, etc., are generally contemplated for use in the present invention.

The adhesion of different layers of the composite plastic film thus obtained is complete and it is difficult to mechanically tear off these two film layers.

In the following, one example of the method for producing the plastic laminated metallic foil according to this invention will be described.

First of all, in preparing the above-mentioned multilayer extrusion composite plastic film, either or both surfaces of the composite plastic film are subjected to adhesion treatment by corona discharge, oxidizing flame, or chemicals. Particularly, corona discharge is preferred. The thus treated composite plastic film is thermally pressed with a metallic foil. The thermally pressing adhesion step is carried out in such a manner that the plastic film is heated so as to soften the surface thereof. It is further pressed under a pressure of 1–10 kg/cm$^2$ at a temperature of 80°–150° C, and then, the resulting laminated plastic film is subjected to heat treatment at a temperature of 150°–230° C for 30 seconds to 5 minutes.

The surface treatment of the seamed layer may be carried out subsequent to thermal pressing of the plastic film with metallic foil.

In the plastic laminated metallic foil thus obtained, the surfaces of different plastics of the multilayer extrusion composite plastic film are completely bonded, so that the both surfaces of the plastics cannot be torn off manually. Furthermore, the adhesion of the metallic foil and the multilayer extrusion composite plastic film is unexpectedly favorable.

Moreover, in the case where the plastic laminated metallic foil is employed as a shielding material for communication cable, the adhesion of the communication cable with the outer polyolefin covering (usually polyethylene) is unexpectedly favorable, because the adhesion is made through the surface of the ethylene-unsaturated carboxylic ester copolymer.

For this reason, when the plastic laminated metallic foil according to the present invention (having a metallic foil on one side and a multilayer extrusion composite plastic film on another side thereof) is employed, for example, as a shielding material for communication cable and capacitor thin film, favorable results are attained due to the excellent bonding between the outer plastic surface and the inner metallic foil surface.

Furthermore, since the plastic laminated metallic foil of this invention has a layer of polyethylene, ethylene-vinyl acetate copolymer, or ethylene-unsaturated carboxylic ester copolymer on the surface of an ethylene-unsaturated carboxylic acid copolymer (which is normally inferior in water resistance, moisture proofness, and adhesiveness with respect to the outer plastic jacket), an excellent electrically insulated water and moisture proof layer can be attained by the adoption of the second plastic layer. This layer also imparts mechanical strength to the metallic foil as well.

When the plastic laminated metallic foil of this invention is employed for communication cable, in the case of bending and stretching of the cable, the metallic foil, double layer plastic film, and plastic jacket move simultaneously, so that they are not torn off with each other. Accordingly, there is no fear of breaking the shielding layer.

As mentioned above, since the plastic laminated metallic foil according to this invention has excellent water resistance properties, moisture proofness, shielding effect, and mechanical strength, the plastic laminated metallic foil may not only be used in the air, but also as communication cable.

In addition to its use as covering material for communication cable, the laminated film of the present invention may also be used for packaging materials and thin films for condensers as well.

A better understanding of the present invention will be attained from the following examples, which are merely intended to be illustrative and yet not limitative of the present invention.

In the following examples, each composite film obtained by multilayer extrusion was prepared in such a manner that both materials of two kinds of films were heated to a temperature of about 100 to 200° C higher than the softening point of each material, respectively. They were then heated at a higher temperature of 10° to 50° C at the vicinity of the outlet of a die and were extruded. The composite film was substantially 0.5 mm in thickness and one sheet of film was about 0.025 mm, its extruding amount being 0.1-10 kg/hr.

EXAMPLES 1 - 6 and

Reference Examples 1 - 3

A double layer of plastic film having a width of 10 cm and a thickness of 0.05 mm as shown in Table 1 was prepared. Soft aluminum having a width of 10 cm and a thickness of 0.2 mm was laminated on the double layer plastic film in a hot blast stove at a temperature of 180° C using a 5 kg load roller.

The adhesiveness between the metallic foil and the plastic film of the resulting plastic laminated metallic foil was measured (A-method).

On the other hand, polyethylene (0506 manufactured by Nitto Unicar Co.) used for the outer polyethylene jacket of a communication cable was formed into a sheet having a thickness of 2 mm. The sheet was heated in a hot blast stove at a temperature of 180° C for 10 minutes. The so heated sheet was superimposed on the plastic surface of the above described plastic laminated metallic foil in the stove and press bonded by one reciprocating motion of 5 kg load roller. The adhesiveness between the polyethylene and the plastic laminated metallic foil was measured (B-method).

The measurement of adhesiveness was carried out by a tearing test under a condition of a temperature of 20° C and a stretching speed of 200 mm/min. at 180° C, respectively.

The results of the test are shown in the following Table 1.

TABLE 1

| | Plastic Film | | Results of Test | |
|---|---|---|---|---|
| | | | A-Method | B-Method |
| | First Layer | Second Layer | g/10 cm | g/10 cm |
| Example 1 | Saline A-1650 Ionomer containing an ethylene-acrylic acid copolymer as a base and obtained by using a Zn salt M.I. = 2.0 | Ethylene-Vinyl Acetate (Evaplex-660, manufactured by Mitsui Polychemicals Co.) (Vinyl Acetate 8 wt.% M.I. = 2.0) | 720 | 3030 |
| Example 2 | Saline A-1601 Ionomer containing an ethylene-acrylic acid copolymer as a base and obtained by using Na salt M.I. = 1.2 | Evaplex-560 (Vinyl Acetate 14 wt.% M.I. = 3.5 | 600 | 2080 |
| Example 3 | Ethylene-Acrylic Acid Copolymer (Acrylic acid 14 wt.%, M.I. = 2.0) | Polyethylene (Corona treated surface) | 550 | 1200 |
| Example 4 | Ethylene-Acrylic Acid Copolymer (Acrylic acid 20 wt.%, M.I. = 3.5) | Ethylene-Vinyl Acetate Copolymer (Vinyl Acetate 10 wt.%, M.I. = 2.0) | 540 | 1500 |
| Example 5 | Ethylene-Acrylic Acid Copolymer (Acrylic acid 10 wt.%, M.I. = 2.0) | Ethylene-Vinyl Acetate Copolymer (Vinyl Acetate 5 wt.%, | 560 | 2600 |

TABLE 1-continued

| | Plastic Film | | Results of Test | |
|---|---|---|---|---|
| | | | A-Method | B-Method |
| | First Layer | Second Layer | g/10 cm | g/10 cm |
| Example 6 | Saline A-1650 | M.I. = 2.0) Polyethylene (Corona treated surface) | 550 | 3200 |
| Reference | | | | |
| Example 1 | Saline A-1601 single layer | | 600 | 240 |
| Example 2 | Polyethylene single layer | | 200 | 1000 |
| Example 3 | Evaplex 660 single layer | | 340 | 1500 |

NOTE: M.I. in the Table designated Melt Index (g/10 min) measured in accordance with ASTM-D-1238.

Each sample in the reference examples was obtained by bonding a single layer film with a metallic foil.

As is apparent from the above-mentioned examples and reference examples, in the plastic laminated metallic foil according to the present invention, its plastic layer had not only excellent adhesiveness with respect to the metallic foil, but also the outer surface polyethylene jacket as well. Accordingly, even when a cable to which the plastic laminated metallic foil of the present invention was applied was bent, there was no tearing off of each material.

Each sample in the reference examples had a certain degree of adhesiveness with respect to either material. But with respect to other materials, the sample film had very low adhesiveness. Hence, after applying the film on a cable after it was bent, each material was easily torn off.

EXAMPLES 7 - 9 and

Reference Examples 4 - 7

Experiments were carried out along those lines of Examples 1-6 and Reference Examples 1-3. The results obtained therefrom are indicated in Table 2, which follows:

TABLE 2

| | Plastic Film Constituting Component | | | |
|---|---|---|---|---|
| | Aluminum Foil Side, (First Layer) Ethylene-Unsaturated Carboxylic Acid Copolymer | (Second Layer Ethylene-Unsaturated Carboxylic Ester Copolymer | Result of Test | |
| | | | A-Method (g/10 cm) | B-Method (g/10 cm) |
| Example 7 | Ionomer Resin Salin A-1650 (Trade Name, manufactured by DuPont Co.) | Ethylene-Ethyl Acrylate Copolymer DPDB-6169 (Trade Name, manufactured by U.C.C. Co.) | 500 | 3200 |
| Example 8 | Saline A-1602 A; Ionomer containing an ethylene-acrylic acid copolymer as a base and obtained by using Na salt M.I. = 1.3 | Ethylene-Ethyl Acrylate Copolymer Zeterfine 30 (Trade Name, manufactured by Dow Chemical Co.) Ethyl Acrylate 30 wt. % | 520 | 3800 |
| Example 9 | Ethylene-Acrylic Acid Copolymer; DQDA-2609 (Trade Name, manufactured by U.C.C. Co.) Acrylic Acid ca. 10 wt.% M.I. = 2.0 | Ethylene-Ethyl Acrylate Copolymer (Zeterfine 35, Dow Chemical Co.), Ethyl Acrylate 35 wt. | 570 | 3200 |
| Reference | | | | |
| Example 4 | Saline A-1650 Single Layer | | 600 | 240 |
| Example 5 | Ethylene-Ethyl Acrylate Copolymer Single Layer (DPDB-6169) | | 550 | 650 |
| Example 6 | Ethylene-Acrylic Acid Copolymer Single Layer (DQDA-2609) Acrylic Acid ca 10 wt.% M.I. = 2.0 | | 700 | 1050 |
| Example 7 | Polyethylene Single Layer | | 200 | 1000 |

The results of the experiments were substantially the same as in Examples 1-6 and Reference Examples 1-3, inclusive.

EXAMPLES 10 - 12 and

Reference Examples 8 - 10

Experiments were carried out along these lines of Examples 1-6 and Reference Examples 1-3. The results obtained therefrom are indicated in Table 3, which follows.

TABLE 3

| | Plastic Film | | Result of Test | |
|---|---|---|---|---|
| | Ethylene-Unsaturated Carboxylic Ester Copolymer (First Layer) | Ethylene-Unsaturated Carboxylic Acid Copolymer (Second Layer) | A-Method (g/10 cm) | B-Method (g/10 cm) |
| Example 10 | Ethylene-Ethyl Acrylate Copolymer DPDB-6169 (Trade Name, manufactured by U.C.C. Co.) | Ionomer Resin Saline A-1650 (Trade Name, manufactured by Du Pont Co.) | 500 | 3200 |
| Example 11 | Ethylene-Ethyl-Acrylate Copolymer Zeterfine 30 (Trade Name, manufactured by Dow Chemical Co.) | Ionomer Resin Saline A-1650 (Trade Name, manufactured by DuPont Co.) | 520 | 3800 |
| Example 12 | Ethylene-Ethyl Acrylate Copolymer Zeterfine 35 | Ethylene-Acrylic Acid Copolymer DQDA-2609 (Trade Name, manufactured by U.C.C. Co.) | 570 | 3200 |
| Reference Example 8 | Ionomer Resin, Single Layer Sheet (Saline A-1650) | | 600 | 240 |
| Reference Example 9 | Ethylene-Ethyl Acrylate Copolymer Single Layer Sheet (DPDB-6169) | | 550 | 650 |
| Reference Example 10 | Ethylene-Acrylic Acid Copolymer Single Layer Sheet (DQDA-2609) | | 700 | 1050 |

The results of the experiments were substantially the same as in Examples 1-6 and Reference Examples 1-3, inclusive.

In the above-described examples, when iron was employed as a metallic foil, its adhesiveness (by B-method) was elevated by 10%, respectively.

Although the present invention has been adequately described in the foregoing specification and examples included therein, it is readily apparent that various modifications and changes may be made without departing from the scope thereof.

What is claimed is:

1. A plastic cable having a covering layer on the outside of its aggregated core and provided with a polyolefin jacket on the outer surface of the covering layer for the aggregated core, said covering layer comprising:
   a. a metallic foil-plastic laminated film having adhered thereto a first layer comprising a ionomer of a base copolymer selected from the group consisting of ethylene-unsaturated carboxylic acid copolymers, ethylene-unsaturated carboxylic acid and ethylene-unsaturated carboxylic acid-unsaturated carboxylic acid ester ternary copolymers, on at least one side of a metallic foil and further having adhered a second layer comprising a polymer selected from the group consisting of ethylene-vinyl acetate copolymer or ethylene-unsaturated carboxylic acid ester copolymers, on the outside thereof, with the first layer being positioned between the metallic foil and the second layer.

2. The plastic cable of claim 1, wherein the polyolefin is polyethylene.

3. The plastic cable of claim 1 wherein
   a. the metallic foil is composed of a member selected from the group consisting of aluminum, copper, iron, steel, silver, gold and tin;
   b. said first layer is of a polymer having a molecular weight of from 10,000 to 50,000 consisting essentially of a member selected only from the group consisting of ionomers of base copolymers of (1) ethylene-unsaturated carboxylic acid copolymers containing from 50 to 98 weight percent ethylene and from 50 to 2 percent acid, and (2) ethylene-unsaturated carboxylic acid-unsaturated carboxylic acid ester ternary copolymers containing from 50 to 98 weight percent ethylene and from 50 to 2 weight percent of the acid and ester wherein no more than 20 weight percent, based upon the weight of ethylene, of the ester is present in said ternary copolymer, and
   c. the second layer is of a polymer having a molecular weight of from 10,000 to 50,000 consisting essentially of a member selected only from the group consisting of ethylene-vinyl acetate copolymers containing no more than 30 weight percent vinyl acetate, and ethylene-unsaturated carboxylic acid ester copolymers containing no more than 95 weight percent of the ester.

4. The plastic cable of claim 3 wherein said metallic foil is composed of aluminum.

5. The plastic cable of claim 3 wherein said unsaturated carboxylic acid is an unsaturated aliphatic carboxylic acid containing 2 to 12 carbon atoms other than those carbon atoms contained in its carboxyl group.

6. The plastic cable of claim 3 wherein said unsaturated carboxylic acid is a member selected from the group consisting of a mono- and divalent carboxylic acid.

7. The plastic cable of claim 3 wherein said unsaturated carboxylic acid is one selected from the group consisting of acrylic acid, methacrylic acid, itaconic acid and maleic anhydride.

8. The plastic cable of claim 3 wherein said unsaturated carboxylic acid is acrylic acid.

9. The plastic cable of claim 3 wherein the amount of ethylene and the carboxylic acid in said ethylene-unsaturated carboxylic acid copolymers ranges from 70 to 90 percent by weight and from 30 to 10 percent by weight, respectively.

10. The plastic cable of claim 3 wherein said unsaturated carboxylic ester is a member selected from the group consisting of ethyl, propyl and butyl esters of an aliphatic unsaturated acid containing 2 to 12 carbon atoms, other than those carbon atoms contained in its carboxyl group.

11. The plastic cable of claim 10 wherein said unsaturated carboxylic ester is the ester of a mono- or dilvalent unsaturated carboxylic acid.

12. The plastic cable of claim 10 wherein said unsaturated carboxylic ester is a member selected from the group consisting of acrylic and methacrylic esters.

13. The plastic cable of claim 10 wherein said unsaturated carboxylic ester is ethylacrylate.

14. The plastic cable of claim 3 wherein said ionomer contains a metal ion selected from the group consisting of magnesium, strontium, sodium and zinc ions.

15. The plastic cable of claim 14 wherein said ionomer consists essentially of an ethylene acrylic acid copolymer acid base and a zinc ion as said metal ion.

16. The plastic cable of claim 14 wherein said ionomer consists essentially of an ethylene-acrylic acid copolymer as said base and a sodium ion as said metal ion.

17. The plastic cable of claim 3 wherein said ethylene-vinyl acetate copolymer has a vinyl acetate content which ranges from 2 to 20 percent by weight.

18. The plastic cable of claim 3 wherein said ethylene-unsaturated carboxylic ester copolymer has an unsaturated carboxylic ester content which ranges from 1 to 95 percent by weight.

19. The plastic cable of claim 18 wherein said ethylene-unsaturated carboxylic ester copolymer has an unsaturated carboxylic ester content which ranges from 1 to 85 percent by weight.

20. The plastic cable of claim 3 wherein the surface of the second polymer layer of the bilayer plastic film is subjected to an adhesion treatment prior to bonding to the metallic foil.

21. The plastic cable of claim 20 wherein the adhesion treatment comprises subjecting said surface to corona discharge.

22. The plastic cable of claim 20 wherein the adhesion treatment comprises subjecting said surface to an oxidizing flame.

23. The plastic cable of claim 20 wherein the adhesion treatment comprises treating said surface with chromic acid.

24. The plastic cable of claim 3 wherein the thickness of the metallic foil ranges from 100 to 250 microns, the total thickness of the first and second layers ranges from 45 to 75 microns and the thickness of the second layer ranges from 20 to 30 microns.

25. The plastic cable of claim 3 wherei said first and second layers comprise simultaneously extruded layers.

26. The plastic cable of claim 25 wherein said first and second layers are thermally pressed together prior to bonding to said metallic foil.

* * * * *